(12) United States Patent
Lisec

(10) Patent No.: US 6,565,420 B2
(45) Date of Patent: May 20, 2003

(54) PROCESS AND DEVICE FOR CUTTING GLASS PANES

(76) Inventor: Peter Lisec, Bahnhofstr. 34, A-3363 Amstetten-Hausmening (AT)

( * ) Notice: Subject to any disclaimer, the term of this patent is extended or adjusted under 35 U.S.C. 154(b) by 67 days.

(21) Appl. No.: 09/746,768

(22) Filed: Dec. 26, 2000

(65) Prior Publication Data

US 2001/0018313 A1 Aug. 30, 2001

(30) Foreign Application Priority Data

Dec. 23, 1999 (AT) .............................................. 2178/99

(51) Int. Cl.[7] ................................................. B24B 1/00
(52) U.S. Cl. ............................. 451/38; 451/39; 451/40; 451/102; 83/861
(58) Field of Search ............................. 451/38, 39, 40, 451/41, 87, 99, 102; 83/861, 879, 880, 168, 99, 177, 169

(56) References Cited

U.S. PATENT DOCUMENTS

| | | | | | |
|---|---|---|---|---|---|
| 4,501,182 | A | * | 2/1985 | Jardat et al. | 83/177 |
| 4,787,178 | A | * | 11/1988 | Morgan et al. | 451/81 |
| 5,003,729 | A | * | 4/1991 | Sherby | 451/38 |
| 5,111,652 | A | * | 5/1992 | Andre | 451/87 |
| 5,908,349 | A | * | 6/1999 | Warehime | 239/430 |
| 6,155,245 | A | * | 12/2000 | Zanzuri | 125/1 |
| 6,305,261 | B1 | * | 10/2001 | Romanini | 451/102 |

* cited by examiner

Primary Examiner—Joseph J. Hail, III
Assistant Examiner—Alvin J Grant
(74) Attorney, Agent, or Firm—Young & Thompson

(57) ABSTRACT

When the glass pane (3) is cut with a water jet which is pointed against the glass pane (3) from a nozzle (7) with high pressure, a water surge is directed at the glass pane (3) on the side opposite the action site of the cutting water jet to a point which is opposite the nozzle (7). The water jet which is cutting the glass pane (3) is captured damped by the water surge without its atomizing and rebounding onto the back-of the glass pane (3).

24 Claims, 1 Drawing Sheet

PROCESS AND DEVICE FOR CUTTING GLASS PANES

BACKGROUND OF THE INVENTION

1. Field of the Invention

The invention relates to a process for cutting glass panes using a pressurized water jet which is pointed at the glass pane and to which an abrasive material is optionally added.

2. Description of the Related Art

It is known that glass panes can be cut using a water jet, a pressure of roughly 3000 bar from a nozzle, is pointed at the glass pane to be cut. The known cutting of glass panes with a water jet is done with the glass panes placed horizontally, underneath the glass pane there being a water bed with a surface which is located under the glass pane at a distance. In the water bed there are supports which project over the water surface and on which the glass pane rests. In the known cutting of glass panes the water jet is moved along the stipulated cutting outline with the glass pane being stationary.

It is a problem in the known process that the water jet inevitably hits the supports now and then, rebounds from them and thus the water jet and the abrasive material contained in it damage the bottom of the glass pane, producing dulled sites in the glass.

To solve this problem it has already been proposed that a foam layer be inserted between the glass pane and the supports. This approach is a problem in that the foam layer must be renewed each time and it crumbles under the action of the water jet, therefore is broken into small parts so that major fouling problems arise.

In the known process for cutting glass panes with a water jet it is also a problem that when the water jet hits a support the water is uncontrollably atomized, producing considerable noise.

SUMMARY OF THE INVENTION

The object of the invention is to devise a process for cutting glass panes with a water jet which solves these problems and which can be carried out especially without the known foam layer.

In the process of the invention the water jet with which the glass pane is cut is precluded from striking any rigid supports, since the water jet which cuts the glass pane from a front side is captured by a water surge directed at the back of the glass pane. In this way, unwanted rebound phenomena and the resulting dulled sites on the glass pane are reliably prevented. Furthermore, the process as claimed in the invention yields the advantage that the noise development when cutting the glass panes with a water jet is greatly reduced. The process as claimed in the invention also offers the advantage that the water beds which are necessary in the known process for cutting glass panes with a water jet are dispensable so that the equipment and operating engineering costs are kept within limits.

Preferably the process as claimed in the invention is carried out with the glass panes aligned roughly vertically.

BRIEF DESCRIPTION OF THE DRAWINGS

Other details and features of the invention result from the following description of one example of the process of the invention with reference to one sample embodiment of a device as claimed in the invention suitable for carrying out the process of the invention, using the drawings, in which:

DESCRIPTION OF THE PREFERRED EMBODIMENTS

Figure 1:
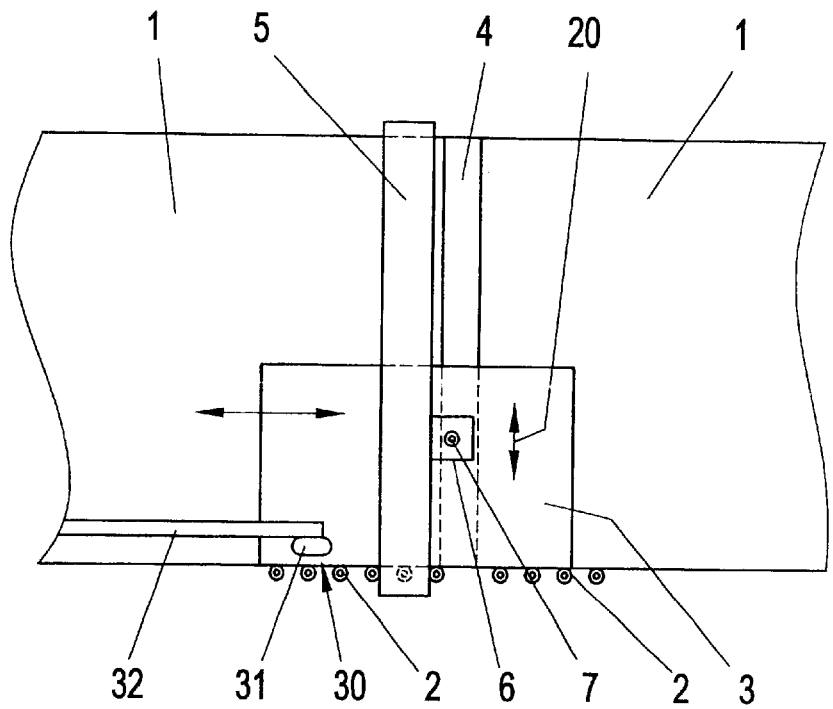
FIG. 1 schematically shows in a front view a device for cutting glass panes with a water jet.

The device as claimed in the invention comprises a support wall 1 which is made as a slide surface (for example a roller bay or air cushion support wall) and Which is aligned essentially vertically and is tilted to the rear preferably by a few degrees, for example by 5°. Glass pane 3 is positioned on a conveyor means 2 (for example a roller conveyor) on the lower edge of the support wall 1 and leans against the support wall 1. In the support wall 1 there is a vertical slotted interruption 4 (gap) which preferably passes over the entire height of the support wall 1.

In front of the support wall 1 there is a guide rail 5 on which a carriage 6 is guided adjustably up and down and which bears a water jet nozzle 7. To move the carriage 6 and thus the water jet nozzle 7 along the guide rail 5, therefore essentially vertically up and down, there are conventional drives for the carriage 6, as for example a toothed belt drive, a spindle drive, a spindle nut drive or a rack and pinion drive (not shown).

Behind the support wall 5 there is likewise a guide rail 10 on which a carriage 11 is guided to be able to move up and down. There is also a drive, for example one of the aforementioned drives, for the adjustment of this carriage 11.

The carriage 11 bears a hollow chamber 12 with an opening 13 which is pointed at the slotted interruption 4 in the support wall 1. A line 14 is connected to the hollow chamber 12 and from a water tank 15, using a pump 16, optionally via a filter 17, the line routes water into the chamber 12 and the water surges out of the opening 13 of the chamber 12.

The drives of the carriage 6 for the water jet nozzle 7 and the carriage 11 for the hollow chamber 12 are synchronized with one another so that the carriages 6 and 11 move up and down synchronously with one another along their respective guide rails 5 and 10. The opening 13 in chamber 12 is therefore maintained in alignment with the water jet nozzle 7. Thus, the water jet nozzle 7 is pointed toward the front of the glass pane 3 and the opening 13 of the hollow chamber 12 is always located in alignment with the axis of the water jet nozzle 7 on the other side (the back) of the glass pane 3.

To simplify synchronization of the movements of the water jet nozzle 7 and the chamber 12 the drives for the carriages 6 and 11 can be coupled to a common drive motor.

The conveyor means 2 on the lower edge of the support wall 1 is aligned for example as a roller conveyor and is coupled to the drive. The conveyor means 2 can also be a (toothed) belt conveyor.

Figure 2:
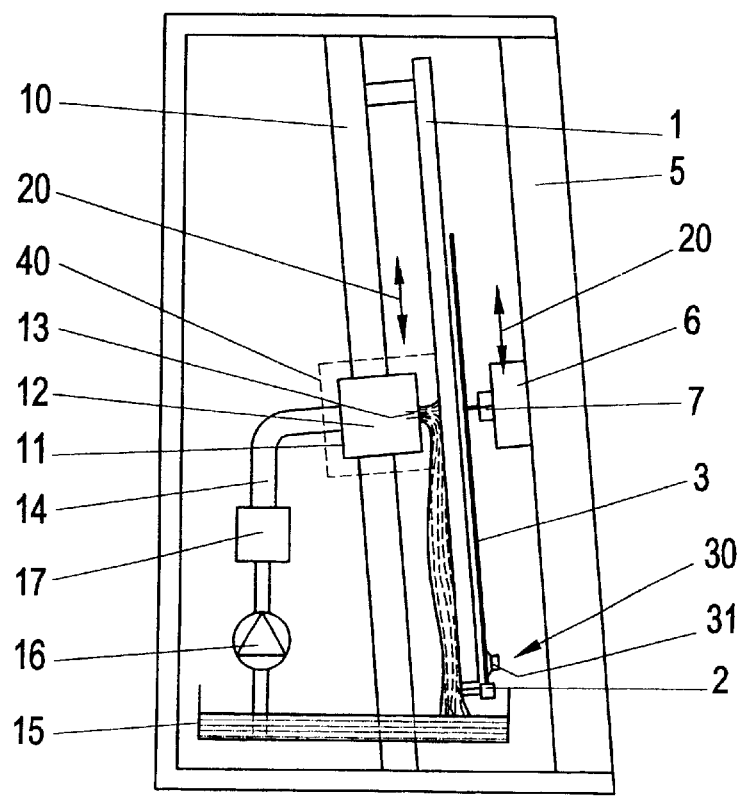
FIG. 2 shows a side view thereof.

When the glass pane 3 is being cut, the water jet nozzle 7 and the hollow chamber 12 with the opening 13 for the water surge pointed at the back of the glass pane 3 are moved simultaneously with it and synchronously up and down, as is illustrated by the arrows 20 in FIGS. 1 and 2. When cuts deviating from the vertical direction are to be produced in the glass pane 3, it is moved using the conveyor means 2 horizontally along the support wall 1. Also combined movements of the water jet nozzle 7 and the glass pane 3 can be carried out in order to be able to cut along any cutting outlines.

To ensure reliable, controlled and accurate movement of the glass pane 3, above the conveyor means 2 there can be driving means 30 (tugging means) which engages preferably the front side of the glass pane 3. In one simple embodiment this driving means 30 is equipped with a vacuum-pressurized suction head 31 which can be moved along the guide rail 32 and which is, applied to the glass pane 3 and provides for reliable and accurate transport of the glass pane 3 in the horizontal direction along the support wall 1.

The tank 15 from which water is routed to the hollow chamber 12 can be used at the same time as a collecting trough for the water emerging from the water jet nozzle 7 and is therefore preferably arranged such that the water running down from the action site of the water jet emerging from the nozzle 7 and the water emerging from the opening 13 of the hollow chamber 12 are captured by the tank 15 which is made as a trough open to the top.

The pressure with which the hollow chamber 12 is supplied with water is such that from its opening 13 surging water makes contact with the back of the glass pane 3 at a point which is opposite the action site of the water jet emerging from the water jet nozzle 7. This effectively prevents the water jet emerging from the water jet nozzle 7 from rebounding off of a hard surface after passing through the glass pane 3. Instead, the water jet is captured and damped by the water surge from the opening 13 in the chamber 12, and therefore the water from the water jet is not atomized. Thus, on the one hand damage to the back of the glass pane 3 is prevented and the noise level during operation of the device is kept within limits.

In addition, the noise level of the device during operation can be limited when the hollow chamber 12 is positioned within a housing 40 of noise-damping material, shown by the broken line in FIG. 2. The walls of the housing 40 extend into the immediate vicinity of the back of the glass pane 3, with only a lower wall of the housing 40 being at a distance from the glass pane 3 in order to allow the water to flow out of the housing 40 and into the collecting trough 15.

In the process and device for cutting glass panes 3 with a water jet as has been described previously, it is a major advantage that the water jet which cuts the glass pane 3 after its passage through the glass pane 3 is captured by the water surge pointed at the back of the glass pane 3 such that rebound of the water mixed with the abrasive onto the glass pane 3 is reliably prevented.

In summary one preferred example of the invention can be described as follows.

When the glass pane 3 is cut with a water jet which is pointed against the glass pane 3 from a nozzle 7 with high pressure, a water surge is directed at the glass pane 3 on the side opposite the action site of the cutting water jet to a point which is opposite the nozzle 7. The water jet which is cutting the glass pane 3 is captured and damped by the water surge without its atomizing and rebounding onto the back of the glass pane 3.

What is claimed is:

1. Process for cutting a glass pane with a water jet, comprising the steps of:
    pointing the water jet at a first side of the glass pane to be cut;
    directing a water surge to a second side of the glass pane opposite the first side so that the water surge contacts the glass pane at a site on the second side that is opposite a site on the first side where the cutting water jet contacts the glass pane; and
    moving the glass pane to be cut relative to the water surge and the water jet.
2. Process as claimed in claim 1, wherein the glass pane to be cut is aligned essentially vertically.
3. Process as claimed in claim 1, wherein both the water jet and the water surge are moved in a first direction, and wherein the glass pane is moved in a second direction, the second direction being perpendicular to the first direction.
4. Process as claimed in claim 3, wherein the water jet and the water surge are moved in a vertical plane and the glass pane is moved horizontally.
5. Process as claimed in claim 1, wherein the water of the water jet and of the water surge running wherein the guide rail (10) is aligned parallel to the support wall (1) and to the interruption (4) in it.
6. Process as claimed in claim 5, wherein the water of the water jet includes an abrasive material, and the water used to form the water surge is filtered to remove abrasive material.
7. Device for executing the process as claimed in claim 1, comprising:
    a nozzle (7) for producing the water jet which cuts the glass pane (3),
    a means for feeding pressurized water to the nozzle (7),
    a means for producing relative motion between the nozzle (7) and the glass pane (3) to be cut,
    a support wall (1) arranged as a sliding surface provided with a conveyor means (2) disposed on a lower edge of the support wall (1) for the glass pane (3),
    wherein the nozzle (7) is disposed on a movable carriage (6) on a guide (5) along the support wall (1), the support wall (1) comprising opposite the nozzle (7) a slot which is aligned parallel to the guide (5) in a vertical plane, a chamber (12) with an opening (13) opposite the nozzle (7) for emergence of a water surge being arranged on a side of the glass pane (3) opposite the nozzle (7), wherein the chamber (12) can be moved synchronously with the nozzle (7).
8. Device as claimed in claim 7, wherein the nozzle (7) is located on a carriage (6), wherein the carriage (6) can be adjusted along a guide rail (5) and wherein the guide rail (5) is aligned parallel to the support wall (1) and to the slot (4) in the support wall.
9. Device as claimed in claim 7, wherein the chamber (12) is located on a carriage (11), wherein the carriage (11) is adjustable along the guide rail (10) and wherein the guide rail (10) is aligned parallel to the support wall (1) and to the slot (4) in the support wall.
10. Device as claimed in claim 8, further comprising a means for adjusting the carriages (6, 11) for the nozzle (7) and the hollow chamber (12).
11. Device as claimed in claim 10, wherein the means for adjusting the carriages (6 and 11) includes only one drive motor.
12. Device as claimed in claim 7, wherein the support wall (1) is tilted to the rear by a few degrees.
13. Device as claimed in claim 12, wherein the slot (4) is aligned in the vertical plane and which passes essentially an entire height of the support wall (1).
14. Device as claimed in claim 8, wherein the guide rails (5 and 10) are aligned according to vertical planes.
15. Device as claimed in claim 7, wherein the conveyor means comprises a tugging means (30) which engages the glass pane (3) for moving the glass pane (3) along the support wall (1).
16. Device as claimed in claim 15, wherein the tugging means (30) has at least one vacuum-pressurized suction head (31) which can be placed against the glass pane (3).
17. Device as claimed in claim 7, further comprising a tank underneath the support wall (1), the tank being arranged as a trough which having an open top.

18. Device as claimed in claim 17, further comprising a line (14) that is supplied with water and that is connected to the chamber (12).

19. Device as claimed in claim 18, wherein the line (14) proceeds from the tank (15).

20. Device as claimed in claim 18, further comprising a filter (17) in the line (14).

21. Device as claimed in claim 7, wherein the chamber (12) is surrounded with a housing (40) of noise-damping material.

22. Device as claimed in claim 21, wherein the housing (40) comprises a plurality of walls extending essentially perpendicular to the glass pane (3), all of the walls except for a lower wall extending directly to the glass pane (3).

23. The method of claim 1, wherein the water jet comprises an added abrasive material.

24. The method of claim 12, wherein the support wall is tilted by 5°.

* * * * *